(No Model.)
T. A. E. CARPENTIER.
Hot or Cold Bed Frame.
No. 239,366. Patented March 29, 1881.
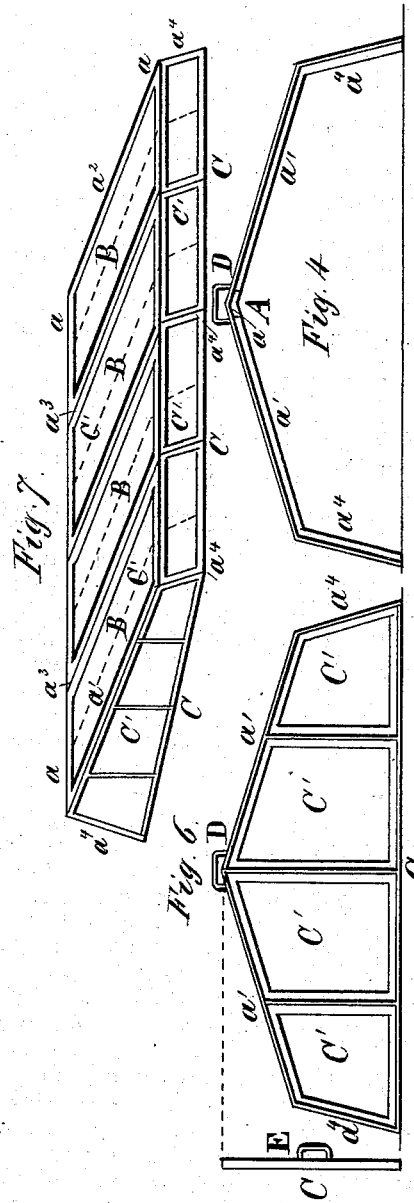
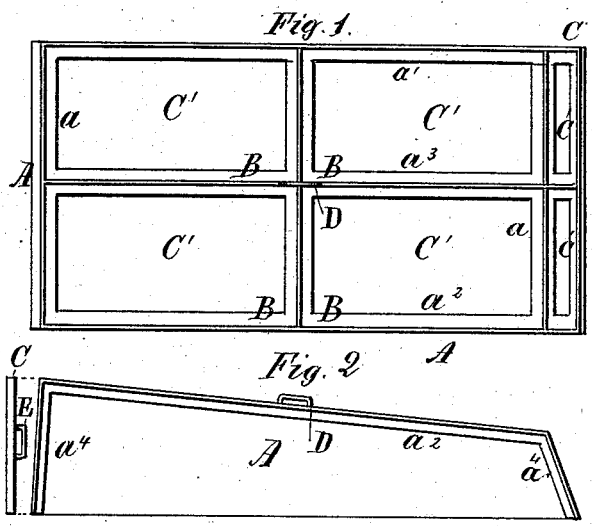
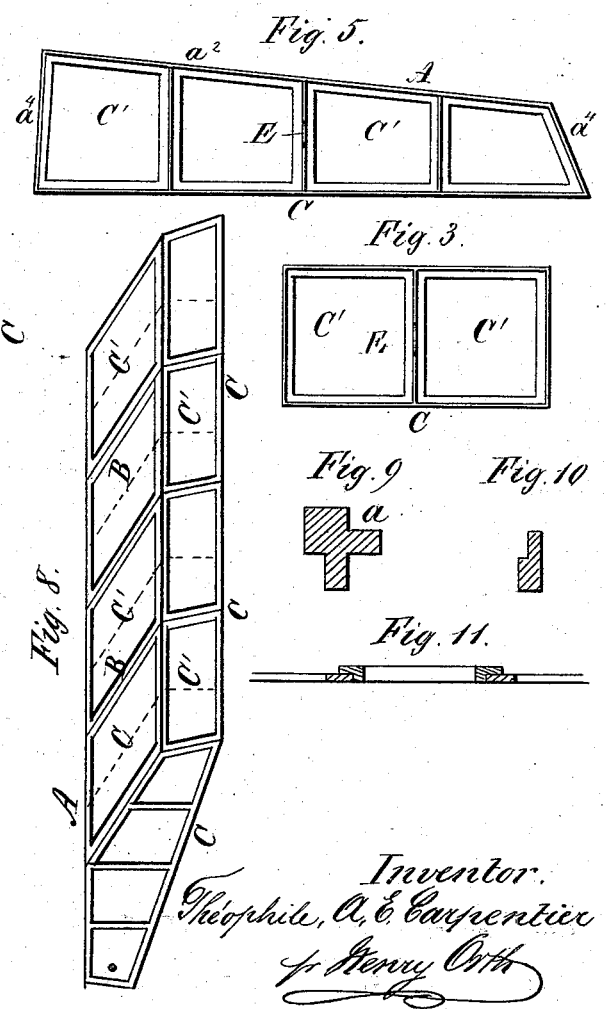
Witnesses
G. B. Fowles
W. Burris
Inventor
Théophile A. E. Carpentier
by Henry Orth
att'y

UNITED STATES PATENT OFFICE.

THEOPHILE A. E. CARPENTIER, OF PARIS, FRANCE.

HOT OR COLD BED FRAME.

SPECIFICATION forming part of Letters Patent No. 239,366, dated March 29, 1881.

Application filed May 24, 1880. (No model.) Patented in France February 14, 1880.

*To all whom it may concern:*

Be it known that. I, THEOPHILE ANCEL EDMOND CARPENTIER, a citizen of the Republic of France, residing at Paris, Department of the Seine, have invented certain new and useful Improvements in Hot or Cold Bed Frames; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Up to the present time, in order to obtain early fruit or vegetables or flowers, agriculturists, horticulturists, or florists have employed what is termed "hot" or "cold" beds or stationary wooden frames covered with glazed sash, the latter forming a removable roof to the permanent box-like frame. This system is the intermediate between hot-house and open-air culture, or between culture by artificial heat exclusively and culture by solar heat and that emanating from the soil or from an underlying bed of compost or manure, the plants being protected from atmospheric influences. These frames vary from twenty to thirty (more or less) centimeters in height from the surface of the soil, and, being formed of boards, deprive the plants from all light or sunshine except that which they receive from the roof. Furthermore, these frames being made of heavy boards, usually sunk some distance in the ground, are difficult of removal, and still more difficult to store away during summer, owing to the room they take up. Hence they form usually a permanent fixture of the garden, the space of ground they inclose being practically wasted, and if not wasted tedious and difficult to cultivate, and said frames are, at all events, very unsightly.

The object of this invention is to obviate these difficulties, and also to afford light and sunshine to the covered plants, not only from the roof, but also from all sides of the frame; and to that end the invention consists in the peculiar construction of the main frame, whereby any extent of ground may be covered by joining two or more of such frames together, and whereby a hot or cold bed may be inclosed by vertical or sloping sides, and a flat or ridge roof admitting light and sunshine to the inclosed plants from all sides.

In the accompanying drawings, Figures 1, 2, and 3 represent, respectively, a plan view and a side and end elevation of a flat-top main frame. Fig. 4 is an end view of a ridge-roof main frame. Figs. 5 and 6 represent, respectively, a side elevation of a flat-roof frame and an end elevation of a ridge-roof frame, with the sashes in position. Figs. 7 and 8 are isometrical views, representing, respectively, a series of frames with their sashes united or joined to form a flat and a ridge-roof frame; and Figs. 9, 10, and 11 are detail views of parts of the device.

In carrying out the invention I prefer to construct the main frame A of two transverse girts, $a$, and two longitudinal girts, $a'$ $a^2$, to form the top or roof of the frame, which is divided into three or four or more panels by means of the longitudinal girts $a^3$. This frame is supported upon four standards, $a^4$, and in practice I prefer to give the latter a slight inclination, as shown, to better refract the light and more effectually shed the water. The longitudinal girts, as well as the transverse girts and standards, are all rabbeted, as shown in Figs. 9 and 10, to receive the sash-frames B, which are constructed, like the main frame, of rabbeted pieces to receive the glass panes C'. Both the main frame A and sash-frames B may be constructed of any suitable material, either wood, metal, or earthenware, and the frame A may be made in separate parts, to be united by screws, pins, bayonet or other joints, so that when the frames are to be removed they may be taken apart for storage. By means of this construction I provide a frame, A, with a paneled top and open sides and ends, the openings of the panels in the top or roof to receive sashes B, and the sides and ends to be closed by like sashes C, as shown in Figs. 5, 6, 7, and 8, the side and end sashes being secured to the main frame A in any desired or preferred manner, either by screws, hooks and staples, pins, or other like fastenings.

In practice, for convenience of handling, transportation, and storage, I have found the following dimensions of frames A best suited— namely, length fifty centimeters; width, one meter, and height in front from thirty to thirty-five centimeters, and in rear from thirty-five to forty centimeters. In general, however, the size of the main frame A should be governed by the size or sizes of the panes of glass always found in the market, and should be as near the above dimensions as this will permit, so as not to incur a waste of glass by cutting. I thus obtain a frame the roof of which will have panels for the reception of four sashes, the ends for the reception of one sash having four panes, or two sashes having two panes of glass each, and the front and rear also having one or two sashes, C, and I prefer, owing to these small dimensions of main frame, to unite the parts thereof permanently and provide the central longitudinal girts, $a^3$, with a handle, D, and if the end and side sashes are made of one sash I provide them also on the center bar with a handle, E, to facilitate their handling and transportation, and to adapt them for use singly as ordinary hand-lights.

I have found that metal is the material best suited for both the main frame and sash-frames, being light, durable, and as cheap, if not cheaper, than any other material that can be advantageously employed for the purpose.

The sash-frames for the roof may be simply laid on and need no other fastening, their weight being sufficient to hold them securely in place, and may, therefore, be removed or partially removed whenever the weather permits or requires this to be done.

In Figs. 4 and 6 I have shown a ridge-roof frame constructed precisely like the flat-roof frame, except that it has a ridge-pole, which, however, is of the same construction as the longitudinal girts of the flat or lean-to-roof frame shown in section, Fig. 9. In practice it will, however, not be necessary to construct such frames, as this may be readily accomplished by placing two of the flat-roof frames back to back—that is to say, with their higher sides united, as shown by Fig. 8, and they may be secured together by pins, bolts, or screws, or other fastening devices, and, if necessary, the seam at the junction may be covered by some suitable waterproofing material, and any number of such frames may thus be united to form a continuous series of ridge-roof beds by first uniting two such frames at their higher sides forming one ridge-roof frame, then uniting therewith two or more frames at their lower sides to the light-sides of the first two, and again two more to the last with their higher sides adjoining. In like manner any extent of ground may be covered by joining a series of flat-roof frames end to end, as shown in Fig. 7.

By means of the above-described construction or any equivalent construction the frames A B are not only made light, portable, and capable of being stored away compactly or used as hand-lights, but the plants covered thereby are exposed to the light and sun upon all sides, and the whole covering may be constructed at a comparatively low cost.

When several of the frames are united the intermediate partitions may be left open, if desired, and the outer transverse girts will have a slightly different rabbet, so that the sash B intermediate of the two frames will overlap the transverse girts, as shown in Fig. 11.

If it is necessary, a series of intermediate braces and supports for the main frame A may be employed to strengthen the same, as shown in dotted lines, Figs. 7 and 8.

I am aware that the sashes of the cold or hot bed frames are made removable while the frame itself is stationary, and is constructed of solid material—either brick, wood, or like material; and I am further aware that a certain number of sashes of hot-houses are made to be raised or capable of sliding, to admit air to the plants, but they are not usually made removable, and I do not wish to claim, broadly, the combination of a removable sash with the cold or hot bed frame.

Having now described my invention, what I claim is—

1. As an improvement in propagating appliances, a hand-light consisting of a skeleton-frame composed of flanged or T-shaped material to form bearings for the sashes, having a paneled top and four supporting-legs arranged in pairs of unequal height, in combination with sashes for said paneled top, sides, and ends, and means to removably connect said sashes with the frame, substantially as and for the purpose specified.

2. As an improvement in propagating appliances, a hand-light constructed and arranged substantially as described, and provided with means whereby two or any number of such lights may be connected together, end to end, or side to side, or both, to form a partitionless continuous lean-to or gable roof propagating-frame, in combination with removable sashes for the top, sides, and ends of said continuous frame, substantially as and for the purpose specified.

In testimony whereof I affix my signature in presence of two witnesses.

THEOPHILE ANCEL EDMOND CARPENTIER.

Witnesses:
ROBT. M. HOOPER,
E. GAGE.